US007053130B2

(12) United States Patent
Nagarajan

(10) Patent No.: US 7,053,130 B2
(45) Date of Patent: May 30, 2006

(54) METHOD TO ACCELERATE BIODEGRADATION OF ALIPHATIC-AROMATIC CO-POLYESTERS BY ENZYMATIC TREATMENT

(75) Inventor: Vasantha Nagarajan, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 48 days.

(21) Appl. No.: 10/852,403

(22) Filed: May 24, 2004

(65) Prior Publication Data

US 2005/0261465 A1    Nov. 24, 2005

(51) Int. Cl.
*C08J 11/04* (2006.01)
(52) U.S. Cl. .......................... 521/48; 521/49.5; 524/17; 524/18; 524/47; 524/60; 524/61; 524/77; 524/81; 524/275; 524/442; 528/491; 528/492
(58) Field of Classification Search .................. 521/48, 521/49.5; 524/17, 18, 47, 60, 61, 77, 81, 524/275, 442; 528/491, 492
See application file for complete search history.

(56) References Cited

U.S. PATENT DOCUMENTS

| | | | |
|---|---|---|---|
| 5,464,766 | A | 11/1995 | Bruno |
| 5,990,266 | A | 11/1999 | Tadros et al. |
| 6,066,494 | A | 5/2000 | Hsieh et al. |
| 6,191,176 | B1 | 2/2001 | Tadros et al. |
| 6,254,645 | B1 | 7/2001 | Kellis, Jr. et al. |
| 6,255,451 | B1 * | 7/2001 | Koch et al. ................. 528/490 |
| 6,350,607 | B1 | 2/2002 | Cooney, Jr. |
| 6,368,710 | B1 | 4/2002 | Hayes |
| 6,521,717 | B1 | 2/2003 | Itoh |

FOREIGN PATENT DOCUMENTS

| | | |
|---|---|---|
| DE | 195 08 737 | 9/1996 |
| EP | 1 090 958 | 4/2001 |

OTHER PUBLICATIONS

Muller Rolf-Joachim et al., "Biodegradation of polyesters containing aromatic constituents", J. of Biotechnology, 86 (2001), 87-95.*
Kint Darwin et al., A review on the potential biodegradability of poly(ethylene terephthalate), Polymer Int. 48:346-352 (1999).*
International Search Report dated Aug. 12, 2004.
Muller et al., Biodegradation of polyesters containing aromatic constituents, 2001, J. Biotechnol., 86: pp. 87-95.
Abou-Zeid et al., Degradation of natural and synthetic polyesters under anaerobic conditions, 2001, J. Biotechnol., 86: pp. 113-126.
Kint, D et al., A review on the potential biodegradability of poly(ethylene terephthalate), 1999, Polym. Int. 48: 346-352.
De Wilde et al., Prerequisites for biodegradable plastic materials for acceptance in real-life composting plants and technical aspects, 1998, J. Polymer Degradation and Stability, 59: pp. 7-12.

(Continued)

*Primary Examiner*—Samuel A. Acquah

(57) ABSTRACT

Provided is a method for accelerating the biodegradation of aliphatic-aromatic co-polyesters comprising greater than 60 mol percent aromatic acid, based on total diacid in the co-polyester. The method involves contacting at least one hydrolytic enzyme in aqueous solution to the co-polyester.

29 Claims, 6 Drawing Sheets

OTHER PUBLICATIONS

Gouda et al., Production of a Polyester Degrading Extracellular Hydrolase from *Thermomonospora fusca*, 2002, Biotechnol. Prog. 18: pp. 927-934.

Witt et al. Biodegradable Polymeric Materials—Not the Origin but the Chemical Structure Determines Biodegradability, 1999, Agnew Chem Int. Ed. 38(10): pp. 1438-1442.

Kleeberg et al., Bioderadation of Aliphatic-Aromatic Copolyesters by *Thermomonospora fusca* and other Thermophilic Compost Isolates, 1998, Appl. Env. Microbiol. 64(5): pp. 173101735.

Bramucci et al., Pure bacterial isolates that convert p-xylene to terephthalic acid, 2002, Appl. Microbiol. Biotechnol., 58:pp. 255-259.

Junker et al., Conjugative Plasmids and the Degradation of Arylsufonates in *Cornamonas testosteroni*, 1997, Appl. Environ. Microbiol. 63: 2403-2410.

* cited by examiner

METHOD TO ACCELERATE BIODEGRADATION OF ALIPHATIC-AROMATIC CO-POLYESTERS BY ENZYMATIC TREATMENT

FIELD OF THE INVENTION

The invention relates to the field of polymer chemistry. More specifically, this invention concerns a method to accelerate the biodegradation of disposed products by the enzymatic treatment prior to or after disposal of aliphatic-aromatic co-polyesters having more than 60 mol percent aromatic acid content based on total acid content.

BACKGROUND OF THE INVENTION

Since synthetic polymers, including poly-ethylene, -styrene, and -propylene, must retain their functionality over widely varying conditions of temperature and pressure fluctuation, flame exposure, etc., they are synthesized to have backbones of only carbon atoms, which makes them resistant to chemical and enzymatic degradation. The introduction of heteroatoms into the polymer backbone creates functional groups, such as esters and amines, which increases the polyester's susceptibility to hydrolytic cleavage, that is, degradation, thereby improving the polyester's ability to biodegrade upon disposal.

Polyester polymers are susceptible to hydrolytic cleavage by either chemical or enzymatic treatment. Many polyesters, especially those made up solely of aliphatic monomers, e.g. polyhydroxybutyrate and poly($\epsilon$-caprolactone), are considered biodegradable. See Muller et al. (2001) *J. Biotechnol.*, 86:87–95; Abou-Zeid et al. (2001) *J. Biotechnol.*, 86:113–126. Aliphatic polyesters, however, lack desired material properties, especially durability, for many applications because of their low melting temperatures and increased susceptibility to degradation. In contrast, aromatic polyesters, which are exemplified by polyethylene terephthalate (PET), have the desired durability for use in a wide array of applications but are generally considered non-biodegradable. See Kint, D. and Munoz-Guerra, S., (1999) *Polym Int* 48:346–352. The tension between durability and biodegradability is an ever-present consideration in achieving cost-effective waste disposal. On the one hand, throwaway goods made of aliphatic polyesters are environmentally attractive yet lack acceptable durability. On the other hand, goods made of aromatic polyesters have the preferred sturdiness but their disposal is much more ecologically burdensome.

A partial resolution to this dilemma is the use of aliphatic-aromatic co-polyesters which yield durable and biodegradable products. However, the use of high aromatic content co-polyesters in throwaway goods is still not entirely satisfactory as the rate of biodegradation is proportional to the content of aromatic acid in the co-polyester. In essence, the tension between durability and biodegradability still remains: the greater the aliphatic content, the more biodegradable but less durable the good. And, the greater the aromatic content, the greater the commercial utility but the greater the potential for lasting environmental harm.

Why the use of untreated aliphatic-aromatic co-polyesters remains an inadequate solution requires some background on current waste disposal practices. Two primary waste disposal practices include landfill use and composting. Landfilling at its simplest involves the dumping of material that is either non-biodegradable or relatively difficult to degrade into a specially-structured pit, lined with plastic and/or clay, and covered over with dirt when full. Landfilling is also known as solid waste treatment. In landfills, solid waste is isolated from ground water and the air; the waste remains dry, is not generally subject to microbial action and therefore decomposes very slowly. Ultimately, landfill use is not a sustainable, long-term solution, given its ever-increasing economic and environmental costs. For example, even though non-biodegradable aromatic polyesters, such as PET, may be degraded chemically in a landfill, such degradation requires significant energy input in terms of high temperatures and potential cleanup of the surrounding soil and ground water owing to the harsh acids needed to break the polymer backbone.

Composting, especially of municipal waste, can be an ecologically attractive alternative to landfilling, but typically also extracts a higher cost because of the need for initial waste sorting and/or separation. See De Wilde, B. and Boelens (1998) J., *Polymer Degradation and Stability,* 59:7–12 describing implementation efforts in Germany, which required initial source-separated waste collection. Composting involves the biodegradation of materials by microbial action. It is largely a two-step enzymatic process that occurs under mildly anaerobic conditions, at temperatures typically not higher than 70° C. and averaging near 55°–60° C., at 100 percent relative humidity and during an exposure period from several weeks to several months. The first step of polymer biodegradation in compost occurs via hydrolysis of the polyester backbone accomplished by extracellular hydrolytic enzymes. These are normally secreted by a mixture of microbial flora and cleave the polyester backbone into smaller polymer fragments and/or the respective monomers. Eventually, cleavage results in fragments and/or monomers capable of being taken up by one or more of the microbial flora, which may or not be the same as those that secreted the enzymes. The second step is biological: microbes take up the fragments and/or monomers and metabolize them into biomass, biogas which includes $CO_2$ and liquid leachate.

Besides serving as an alternative to landfill use, composting is also used as a landfill auxiliary to reduce the amount of non-recyclable, solid landfill waste and to produce cheap, beneficial fertilizer. One limitation to marketing compost, however, is its visible contamination by un-degraded biodegradable polymers, such as plastic film and fiber fragments. Because composting is an environmentally attractive waste process that can result in a commercially valuable product, there is a need for a method that improves the degradation of biodegradable polymers, particularly aliphatic-aromatic co-polyesters, during composting. Such a method would augment the environmental and commercial benefits of composting by reducing the need for and cost of initial source separation of waste.

Other waste disposal practices include wastewater treatment systems, septic systems and garbage disposal systems. As with landfilling and composting, wastewater treatment is practiced at the level of the community and involves the treatment of sewage and the renovation of wastewater before the water is re-used or re-enters a body of water. Preliminary treatment of sewage screens out solid material, such as diapers and other co-polyester goods, sand, gravel, large food particles from garbage disposals, etc., from untreated human waste and grey water. The collected debris is subsequently disposed of in a landfill and/or composting system. Other kinds of sedimented organic waste collected from wastewater systems include sludge and scum. These may contain co-polyesters that may be biodegraded. Once sedimented from wastewater, sludge and scum are pumped into digesting tanks where microorganisms break down the waste for about a month, which is then sent to a landfill. Septic systems and garbage disposal systems are practiced at the individual residence level and are typically not implicated in the disposal of goods made of high aromatic co-polyesters, like soda bottles or diapers. Disposal of such goods in these systems generally causes costly damage.

Certain aliphatic-aromatic co-polyesters are biodegradable under mildly anaerobic composting conditions and yet retain some desirable material properties, such as gas barrier permeability, strength, chemical resistance, and sterility (Muller et al., supra). Specifically, aliphatic-aromatic co-polyesters having up to 60 mol per-cent aromatic acid relative to the total acid content have been reported biodegradable. See Gouda et al. (2002) *Biotechnol Prog* 18:927–934; Witt et al. (1999) *Angew Chem Int Ed* 38(10): 1438–1442; Kleeberg et al. (1998) *Appl. Env. Microbiol.* 64(5):1731–1735; Muller et al. (supra); and U.S. Pat. No. 6,255,451 to Koch et al. These co-polyesters are therefore eminently compostable. On the other hand, high aromatic content co-polyesters, i.e., those having greater 60 mol percent aromatic acid relative to the total acid content, are generally considered to have a biodegradation rate "so small that such materials will not be suitable for degradation in a composting process" (Muller et al., supra).

Various methods to increase the degradation rates of aliphatic-aromatic co-polyesters using hydrolytic enzymes and/or various microbial consortia to mineralize the polymers into carbon dioxide, biomass, and liquid leachate have been reported. These reports include: the treatment of foodstuff waste using hydrolytic enzymes, e.g. lipases, esterases, proteases, amylases, cutinases, etc. (U.S. Pat. No. 6,350,607 to Cooney, Jr.); the use of enzyme catalysts and/or mixed cultures of microorganisms for the degradation of polyesters (U.S. Pat. Nos. 5,990,266 and 6,191,176 to Tadros et al.); Abou-Zeid et al., supra; Witt et al., supra; Muller et al., supra; Kint and Munoz-Guerra, supra; Kleeberg et al., supra; U.S. Pat. No. 6,255,451 to Koch et al.; and Gouda et al., supra. However, these reports used copolymers having an aromatic acid content of not greater than 60 mol percent of the total acid content. None of these reports discuss methods that have effectively degraded high aromatic content co-polyester.

The technical problem of composting aliphatic-aromatic co-polyesters having greater than 60 mol percent aromatic acid relative to the total acid content may be exemplified by the obstacles in biodegrading polyethyleneterephthalate (PET). In theory, PET can be subjected to the second step of enzymatic action in composting and therefore biodegraded. That is, the microbial flora may catabolize monomers that comprise the aromatic polyesters of PET. Indeed, microbes that mineralize terephthalic acid have been isolated from a variety of environments. See Bramucci et al. (2002) *Appl Microbiol Biotechnol*, 58:255–259 and Junker, F. and Cook, A. (1997) *Appl Environ Microbiol* 63:2403–10. However, the difficulty in composting PET lies, not with the second, but with the first step of enzymatic action; that is, the breakdown of the polymer backbone through microbe-produced hydrolytic enzymes, resulting in cleaved fragments and monomers that microbes can mineralize. Since PET in essence comprises 100% aromatic diacid (terephthalic acid and esters thereof) based on total acid content, the PET polymer backbone is resistant to hydrolytic cleavage.

Modification of the polymer backbone to increase its susceptibility to hydrolytic cleavage is an important key to enhancing the breakdown of an aliphatic-aromatic co-polyester containing greater than 60 mol percent terephthalic acid, or other aromatic acid, relative to the total acid. Modification may occur in several ways. One strategy is to incorporate molecules into the polyester backbone, which may influence biodegradability, such as 5-sulphoisophthalate, into the polyester backbone. See U.S. Pat. No. 6,368,710 to Hayes. This modification makes the polymer less resistant to hydrolysis due to the activating effect exerted by the strong electron-withdrawing substitute. See Kint, D., and Munoz-Guerra, S., supra. Even though the 5-sulfoisophthalate-containing aliphatic-aromatic co-polyesters have been shown to be compostable, there remains a need for a method to increase the rate of degradation for any sulfonated aliphatic-aromatic co-polyesters having more than 60 mol percent aromatic acid content based on total acid content.

A second strategy for increasing susceptibility to hydrolytic cleavage is to treat high aromatic co-polyesters with hydrolytic enzymes before or after the co-polyesters enter the waste cycle. Numerous enzymes, known in the art, can degrade polymers containing hydrolyzable groups, such as esters, amides, etc. U.S. Pat. No. 6,255,451 to Koch et al. describes the use of a cutinase from *Humicola insolens* and lipases from *Aspergillus niger, Mucor Miehei* (Lipozyme 20,000 L), and *Candida antartica* (lipase component B) to degrade substrate polymers that are aliphatic polyesters, aromatic polyester amides or partially aromatic polyester urethanes. U.S. Pat. No. 6,066,494 to Hsich et al. and U.S. Pat. No. 6,254,645 to Kellis et al. describe the use of lipases or polyesterases to modify polyester fiber to enhance wettability and absorbancy of textiles. U.S. Pat. No. 6,350,607 to Cooney, Jr. discusses the use of enzymes for treatment of macerated food waste products in conjunction with garbage disposal apparatus and U.S. Pat. No. 5,464,766 to Bruno reports waste treatment compositions containing bacteria and enzymes for municipal and yard waste.

However, none of these reports concerns the breakdown of aliphatic-aromatic polymers having greater than 60 mol percent aromatic acid content relative to the total acid content. Despite the current inability to biodegrade high aromatic co-polyesters in typical waste contexts, and particularly in compost, finding a solution to biodegrade these is precisely what is needed to make municipal composting a workable waste process. Such a solution would eliminate the need for source separation of waste and provide commercially valuable fertilizer-quality compost. In addition, such a solution would also accelerate the rate of degradation of high aromatic goods disposed of in landfills.

Thus, the problem to be solved is the development of a method to increase the rate of biodegradation in typical composting conditions, and in other waste contexts, of aliphatic-aromatic co-polyesters having more than 60 mol percent aromatic acid content relative to the total acid content. The solution provided is effective enzymatic treatment of throwaway co-polyesters that begins and hastens biodegradation either before or after the co-polyesters are disposed. Put differently, the solution is an effective enzymatic treatment of throwaway co-polyesters previously regarded as very slow to biodegrade, which induces and accelerates the first step of biodegradation, i.e., hydrolytic breakdown of the polymer backbone. The present solution is especially useful for accelerating the degradation of sulfonated co-polyesters having more than 60 mol percent aromatic acid content.

SUMMARY OF INVENTION

The present invention provides methods for increasing hydrolytic degradation by microorganisms of an aliphatic-aromatic co-polyester, the co-polyester comprising at least one aromatic dicarboxylic acid or an ester thereof, and at least one aliphatic dicarboxylic acid or an ester thereof, the aromatic acid comprising greater than 60 mol percent to about 99 mol percent of total dicarboxylic acid in the co-polyester, the method comprising contacting at least one hydrolytic enzyme in aqueous solution to the co-polyester. Such a co-polyester is also identified as a high aromatic co-polyester or the co-polyester of interest. More specifically, the co-polyester of interest may comprise at least about 61 mol percent to about 90 mol percent or at least about 70, or 75, or 80 mol percent up to about 90 mol percent of the at least one aromatic dicarboxylic acid or ester, based on total dicarboxylic acid in the co-polyester.

In one embodiment, the at least one aromatic dicarboxylic acid or ester may be selected from the group consisting of terephthalic acid, dimethyl terephthalate, isophthalic acid, dimethyl isophthalate, 2,6-napthalene dicarboxylic acid, dimethyl-2,6-dicarboxylic acid, dimethyl-2,6-naphthalate and mixtures of these and the at least one aliphatic dicarboxylic acid or ester may be selected from the group consisting of succinic acid, dimethyl succinate, glutaric acid, dimethyl glutarate, 2-methylglutaric acid, 3-methylglutaric acid, adipic acid, dimethyl adipate, oxalic acid, dimethyl oxalate, malonic acid, dimethyl malonate, and mixtures of these. In this embodiment, the co-polyester may comprise between about 1 mol percent and less than about 40 mol percent of the at least one aliphatic acid or ester, based on total dicarboxylic acid in the co-polyester. In a further embodiment, the co-polyester may comprise between about 10 mol percent and less than 40 mole percent of at least one aliphatic acid or ester. In an additional embodiment, the co-polyester may comprise between about 20 mol percent and less than 40 mol percent of at least one aliphatic acid or ester. In these embodiments the co-polyester may further comprise at least one diol, which may be selected from the group consisting of 1,2-ethane diol, 1,3-propane diol, 1,4-butane diol, 1,6-hexane diol, ethylene glycol, di(ethylene glycol), tri(ethylene glycol), poly(ethylene glycol), poly(alkylene ether) glycols, poly(propylene ether) glycols and mixtures of these. In another embodiment, the co-polyester may be combined with starch, protein, cellulose, wax, fillers, silicate fillers, polylactic acid, polyhydroxyamide or mixtures of these.

Alternatively, the co-polyester may also comprise a sulfonated compound, which may comprise between about 0.1 to about 10.0 mol percent of the co-polyester, based on total diol or total dicarboxylic acid in the co-polyester. In a further embodiment, the co-polyester may comprise a sulfonated compound between about 0.1 and 5.0 mol percent. The sulfonated compound may be selected from the group consisting of a sulfonated mono or dicarboxylic acid or an ester or metal salt thereof. The sulfonated compound may further be selected from the group consisting of sulfosuccinic acid, 3-sulfobenzoic acid, 4-sulfobenzoic acid, 5-sulfosalicylic acid, sulfophthalic acid, sulfoterephthalic acid, and 5-sulfoisophthalic acid, or an ester or salt thereof. In this embodiment, the sulfonated co-polyester may comprise between about 1 mol percent to less than about 40 mol percent and in another embodiment, between about 10 mol percent to less than about 40 mol percent of the at least one aliphatic carboxylic acid or ester based on total dicarboxylic acid content; it may further comprise at least one diol. In a further embodiment, the sulfonated co-polyester may comprise between about 20 mol percent to less than about 40 mol percent of at least one aliphatic carboxylic acid or ester. In another embodiment, the co-polyester comprises about 17.5 mol percent dimethyl glutarate and about 2 mol percent dimethyl 5-sulfoisophthalate, sodium salt, based on total dicarboxylic acid in the co-polyester, and may further comprise about 8 wt percent poly(ethylene glycol).

In another embodiment, the aqueous solution comprises between about 0.1 to about 10 wt percent of the at least one hydrolytic enzyme, which may be selected from the group consisting of proteases, lipases, cutinases, esterases and a combination of these. In any of the above embodiments, the at least one hydrolytic enzyme may comprise a lipase.

In one embodiment, the contacting of the at least one hydrolytic enzyme to the co-polyester occurs before degradation of the co-polyester by the microorganisms. In another embodiment, the contacting occurs when the co-polyester is situated in a waste context, which may be solid waste or compost or a wastewater treatment system. Contacting the at least one hydrolytic enzyme to the co-polyester of interest may be by spraying, painting, coating, applying, or mixing.

BRIEF DESCRIPTION OF THE DRAWINGS

The invention can be more fully understood from the Figures and the detailed description that together form this application.

DETAILED DESCRIPTION OF THE INVENTION

Figure 1A:
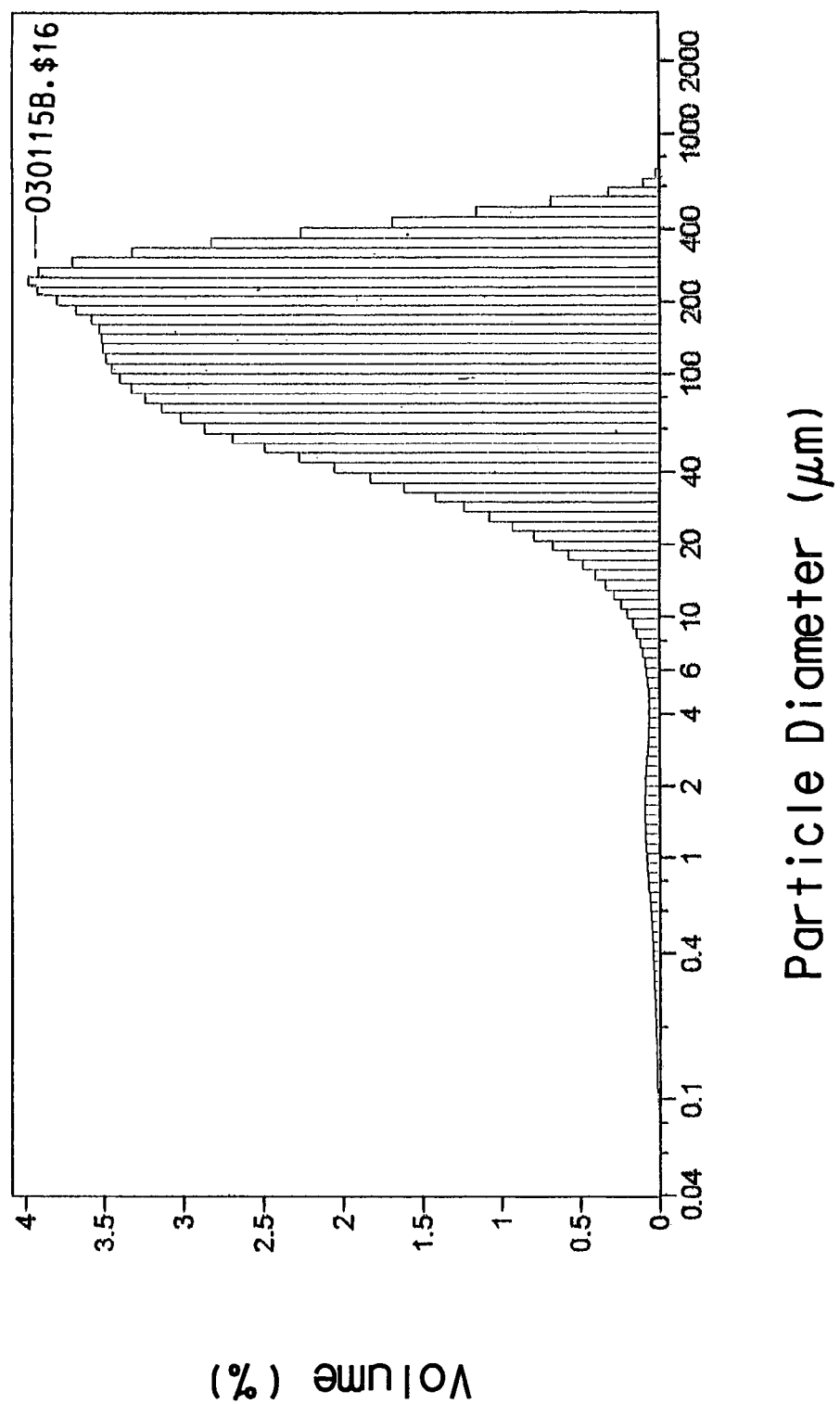
FIG. 1 shows effect of lipase treatment on the degradation of Polymer B in aquatic reactor after enzyme treatment.

In its broadest terms, the present invention provides a method to accelerate the biodegradation of aliphatic-aromatic copolyester waste. Specifically, the present invention provides a method to increase the rate of biodegradation of high aromatic co-polyesters by treatment with hydrolytic enzymes. Such treatment accelerates the overall biodegradation of high aromatic co-polyesters by increasing the degradation of the polymer backbone. In a particularly useful embodiment, the high aliphatic-aromatic co-polyester comprises a sulfonated component.

In this disclosure, a number of terms and abbreviations are used for which the following definitions pertain:

"High aromatic co-polyester" refers to aliphatic-aromatic polyesters that contain more than 60 mol percent aromatic diacids relative to the total acid content of the polyester, such as terephthalic acid. These are also referred to as "co-polyesters of interest". Particularly useful high aromatic co-polyesters comprise a sulfonated component.

"Aliphatic-aromatic co-polyester" refers to a polyester for which some of the aliphatic diacid building blocks have been substituted by aromatic diacids.

"60 mol percent diacid content" refers to "60 mol percent dicarboxylic acid content" and are to be considered equivalent. Also, "60 mol percent acid content" also refers to "60 mol percent diacid content" as in this discussion, the aliphatic-aromatic polyesters comprise aliphatic dicarboxylic acids and aromatic dicarboxylic acids.

"Total acid content" and "based on total dicarboxylic acid" are equivalent and refer to the total content of aromatic plus aliphatic dicarboxylic acid in the aliphatic-aromatic co-polyester.

"Sulfonated co-polyester" refers to a polyester containing a 5-sulfoisophthalic acid derivative as one of the constituent monomers.

"Sulfonated aliphatic-aromatic co-polyester" contains greater than 60 mol percent aromatic dicarboxylic acid, typically terephthalic acid; less than 40 mol percent aliphatic dicarboxylic acid, such as glutaric, adipic, and succinic acids; 0.1–10 mol percent—optionally 0.1 mol percent to 5.0 mole percent—of a sulfonated component such as 5-sulfoisophthalic acid and which may specifically be 0.1–3 mol percent dimethyl-5-sulfoisophthalic acid sodium salt; and optionally a diol such as ethylene glycol, 1,3-propanediol, and 1,4-butanediol.

"Hydrolytic enzymes" refer to a class of hydrolases that include, but are not limited to proteases, lipases, cutinases and esterases. These enzymes have been proven useful for a variety of industrial applications, including the enzymatic hydrolysis of polyesters.

"Hydrolysis" refers to the primary mechanism of action in degrading polymers and means here hydrolysis mediated by hydrolytic enzymes. It includes the breaking of ester and amide linkages from the polymer backbone by the addition of water mediated by hydrolytic enzymes to result in the parent carboxylic acid group and the respective functional group, that is, the hydroxyl functional group for esters (i.e. alcohols such as methanol) and the appropriate amine for amides. This is also known as hydrolytic degradation of the polymer backbone.

"Lipase" refers to an enzyme that catalyzes the hydrolysis of fats into glycerol and fatty acids by hydrolyzing ester bonds.

"Cutinase" refers to a hydrolytic enzyme that degrades cutin, the cuticular polymer of higher plants, which is a polyester composed of hydroxy and epoxy fatty acids. The fatty acids of cutin are usually n-$C_{16}$ and n-$C_{18}$ and contain one to three hydroxyl groups. Ester bonds predominate in the cutins, although peroxide bridges and ether linkages may also be present.

"Esterase" and "polyesterase" are used interchangeably to refer to an enzyme that catalyzes the hydrolysis of an ester.

"Protease" refers to an enzyme that catalyzes the hydrolytic breakdown of proteins via hydrolysis of peptide bonds.

"Biodegradable" or "degradable" describes polymers that can be broken down chemically by natural biological processes, such as being digested by bacteria or fungi into smaller components not harmful to the environment.

"Biodegradation by microbial action" or "biodegradation" refers to what is believed to be a two step process of the break down of co-polyesters that have been disposed as waste. In the first step, hydrolytic enzymes secreted by microorganisms in the soil break down the polymer backbone of the co-polyesters into monomers and/or smaller fragments; in the second step, microorganisms, either the same or different as in the first step, take up the monomers and broken down fragments and catabolize them into biomass, biogas, and liquid leachate.

"Rate of biodegradation/biodegradability" refers to the speed, velocity or rate at which biodegradation occurs. This varies depending on the conditions of temperature, humidity, exposure to air, etc. in the waste context in which the co-polyester of interest has been disposed. Comparison of the rate of biodegradation among various waste contexts is generally ordinal and relative. The absolute rate of biodegradation for a specific waste context is difficult to compute with precision, as biodegradation is a unique characteristic of specific waste conditions and specific waste mass.

"Waste context" refers to and includes composting, landfill, solid waste, wastewater treatment system, septic tank system, and garbage disposal system.

"Composting" refers to a process of degrading waste materials under conditions no higher than 70° C., and averaging more nearly 55–60° C., at or near nd 00 percent relative humidity, and for durations ranging from two weeks to more than several months. The materials continue to degrade into low molecular weight fragments and/or monomers which can ultimately be biodegraded, that is, metabolized by microorganisms, completely into biomass, biogas, and liquid leachate.

"Compost tea" refers to a liquid (aqueous) extract from compost that contains soluble nutrients and a diverse mix of microorganisms capable of growing on the decaying compost material.

"A wastewater treatment system", also known as sewage treatment, involves a multi-stage process to renovate wastewater before it reenters a body of water, or is applied to the land or reused. Generally, the first stage comprises screening out solid debris, which may include co-polyesters of interest and is typically deposited into a landfill. In a subsequent stage, solid organic waste comprising sedimented sludge and scum, which may also contain co-polyesters of interest, are digested for about a month in a digesting tank. Contacting hydrolytic enzymes to both the screened solid debris and the matter in the digesting tank is contemplated.

"Landfill" refers to a specially structured solid waste pit, lined with plastic and/or clay into which solid waste is dumped, isolated from ground water and air, and kept dry, thereby preventing microbial action from breaking down the waste, which, as a result, degrades slowly. A landfill is a solid waste context, generally in an anaerobic environment at the temperature of the ambient air or adjacent soil in relatively low humidity.

"Contacting" is equivalent to "treating" and refers to placing a hydrolytic enzyme in contact with a co-polyester such that the hydrolytic enzyme can begin hydrolysis of the polymer backbone. "Treatment" refers to contacting the hydrolytic enzyme with a co-polyester at any point during the cycle of use and disposal of the co-polyester and includes the concepts of "pre-treatment" of the co-polyester before disposal and "post-treatment" after disposal. "Contacting" includes spraying, treating, pouring on or in, mixing, combining, painting, coating, applying, affixing to and otherwise communicating the hydrolytic enzyme with the co-polyester.

"Other biodegradable compounds" refers to substances besides aliphatic-aromatic co-polyesters that are able to decay naturally, harmlessly and relatively more quickly than high aromatic co-polyesters. These include starch, protein, cellulose, beeswax, montan-ester wax, leather, paper, fabric, fillers, such as calcium carbonate, calcium carbonate phosphates, and titanium dioxide, cellulosic fillers, silicate fillers, such as silicon dioxide, biodegradable adhesives, polylactic acid, polyhydroxyamide and mixtures of these.

All other terms are defined by reference to the following dictionaries: the WEBSTER'S THIRD NEW INTERNATIONAL DICTIONARY, UNABRIDGED (1993), Merriam-Webster, Springfield, Mass., and Lewis, R J (2001) HAWLEY'S CONDENSED CHEMICAL DICTIONARY, $14^{th}$ Ed, John Wiley & Sons, New York, N.Y.

Abbreviations

The following abbreviations are used throughout:

| | |
|---|---|
| polyethylene terephthalate | PET |
| polybutylene terephthalate | PBT |
| polyethylene ether radical consisting of —(CH2)2-O—(CH2)2- | DEG |
| polyethylene ether radical consisting of —(CH2)2-O—(CH2)2-O—(CH2)2- | TEG |
| of ethylene —(CH2)-, —(CH2)3- | 3G |
| —(CH2)4- | 4G |
| carbon dioxide | $CO_2$ |
| Polylactic acid | PLA |
| Polyhydroxyamide | PHA |
| Weight | wt |
| Mole | mol |

Structure of Aliphatic-Aromatic Co-Polymers Biodegraded by the Present Method The present method increases the rate of biodegradation of throwaway polymers through treatment of the polymers with a hydrolytic enzyme catalyst. Polymers are used to manufacture a wide variety of commercial products that include textiles, containers and packaging because of their capacity to be formed into goods at high temperatures while exhibiting gas barrier properties and biodegradability.

The polymers of significance for this method are co-polyesters, which contain in chain ester groups that are derived from the condensation of a diacid with a diol or from the polymerization of hydroxyacids. Co-polyesters are degradable polymers because they possess functional groups, such as esters, amides and urethanes, which are susceptible to hydrolysis, i.e., hydrolytic cleavage. Cleaving the polymer backbone through hydrolysis of these functional groups mediated by a hydrolytic enzyme creates smaller polymer fragments of monomers that microorganisms can take up and then metabolize into biomass, biogas (i.e. $CO_2$), and liquid leachate.

In aliphatic polyesters, the diacid component is predominantly an aliphatic acid; these polymers are exemplified by polyhydroxy alkanoates produced by microorganisms or synthetic polymers such as poly caprolactone or poly lactide. Aromatic polyesters are polymers such as polyethylene terephthalate (PET) or polybutylene terephthalate (PBT) in which the diacid component is an aromatic acid such as terephthalic acid or ester thereof. Many of the preferred material characteristics of polyesters, such as thermal stability, gas and liquid permeability, etc., are related to the relative amount of aromatic monomers in the polyester. Aromatic polyesters make up, for example, throwaway plastic beverage bottles. These are generally considered difficult- to impossible-to-biodegrade because the aromatic acid used, such as terephthalic acid, makes the polymer backbone resistant to hydrolytic degradation.

Hydrolysis is a process in which a molecule is cleaved in two by the addition of a molecule of water. This process can occur both chemically and enzymatically. In a hydrolysis reaction that involves breaking an ester bond, one hydrolysis product contains a hydroxyl functional group, and the other a carboxylic acid functional group. Amides hydrolyze to the parent carboxylic acid and the corresponding amine.

Aliphatic-aromatic co-polyesters are polyesters derived from a mixture of aromatic diacids, e.g. terephthalic acid or ester derivatives thereof, and aliphatic diacids which are typically linear polyalkylene groups, $C_2$ to $C_{10}$ in length. Muller et al. (supra) report that aliphatic-aromatic co-polyesters containing more than 60 mol percent terephthalic acid as diacid relative to the total acid content are considered essentially non-biodegradable (or at least very slow to degrade) and therefore non-compostable.

Aliphatic-aromatic co-polyesters having greater than 60 mol percent aromatic acid content relative to the total acid content plus those co-polyesters also having 0.1 to 10 mol percent sulfonate radical (see U.S. Pat. No. 5,097,004 to Gallagher and U.S. Pat. No. 6,368,710 to Hayes, which are incorporated herein by reference) are the co-polyesters upon which the present method is designed to work. Even though these co-polyesters have been reported to be biodegradable, there is a general need to increase their rate of biodegradation. The technical solution of the present method is to contact the sulfonated co-polyesters with hydrolytic enzymes either before or after disposal to increase the rate of hydrolytic cleavage of the polyester backbone. In this way, rate of biodegradation for these co-polyesters increases in a variety of waste contexts, such as compost facilities, solid waste facilities, and wastewater treatment systems.

The aliphatic dicarboxylic acid component may include unsubstituted, substituted, linear, and branched, aliphatic dicarboxylic acids and the lower alkyl esters of aliphatic dicarboxylic acids having 2 to 36 carbon atoms. Specific examples of an aliphatic dicarboxylic acid component include oxalic acid, dimethyl oxalate, malonic acid, dimethyl malonate, succinic acid, dimethyl succinate, methylsuccinic acid, glutaric acid, dimethyl glutarate, 2-methylglutaric acid, 3-methylglutaric acid, adipic acid, dimethyl adipate, 3-methyladipic acid, 2,2,5,5-tetramethylhexanedioic acid, pimelic acid, suberic acid, azelaic acid, dimethyl azelate, sebacic acid, 1,11-undecanedicarboxylic acid, 1,10-decanedicarboxylic acid, undecanedioic acid, 1,12-dodecanedicarboxylic acid, hexadecanedioic acid, docosanedioic acid, tetracosanedioic acid, dimer acid, and mixtures of these. Particularly useful are the following: succinic acid, dimethyl succinate, glutaric acid, dimethyl glutarate, adipic acid, dimethyl adipate and mixtures of these. However, these lists are not intended as inclusive and any aliphatic dicarboxylic acid component known in the art may be useful in the present method.

The aromatic dicarboxylic acid component includes unsubstituted and substituted aromatic dicarboxylic acid and the lower alkyl esters of aromatic dicarboxylic acids having from 8 carbons to 20 carbons. Examples of desirable diacid moieties include those derived from terephthalates, isophthalates, naphthalates and dibenzoates. Specific examples of the aromatic dicarboxylic acid component include terephthalic acid, dimethyl terephthalate, isophthalic acid, dimethyl isophthalate, 2,6-napthalene dicarboxylic acid, dimethyl-2,6-naphthalate, 2,7-naphthalenedicarboxylic acid, dimethyl-2,7-naphthalate, 3,4'-diphenyl ether dicarboxylic acid, dimethyl-3,4'diphenyl ether dicarboxylate, 4,4'-diphenyl ether dicarboxylic acid, dimethyl-4,4'-diphenyl ether dicarboxylate, 3,4'-diphenyl sulfide dicarboxylic acid, dimethyl-3,4'-diphenyl sulfide dicarboxylate, 4,4'-diphenyl sulfide dicarboxylic acid, dimethyl-4,4'-diphenyl sulfide dicarboxylate, 3,4'-diphenyl sulfone dicarboxylic acid, dimethyl-3,4'-diphenyl sulfone dicarboxylate, 4,4'-diphenyl sulfone dicarboxylic acid, dimethyl-4,4'-diphenyl sulfone dicarboxylate, 3,4'-benzophenonedicarboxylic acid, dimethyl-3,4'-benzophenonedicarboxylate, 4,4'-benzophenonedicarboxylic acid, dimethyl-4,4'-benzophenonedicarboxylate, 1,4-naphthalene dicarboxylic acid, dimethyl-1,4-naphthalate, 4,4'-methylene bis(benzoic acid), dimethyl-4,4'-methylenebis(benzoate), and mixtures of these. Particularly useful are the following aromatic dicarboxylic acid components: terephthalic acid, dimethyl terephthalate, isophthalic acid, dimethyl isophthalate, 2,6-naphthalene dicarboxylic acid, dimethyl-2,6-naphthalate, and mixtures of these. However, these lists are not intended as inclusive and any aromatic dicarboxylic acid component known in the art may be useful in the present method.

Sulfonated aliphatic-aromatic co-polyesters have been reported in the art. See U.S. Pat. No. 5,171,308 to Gallagher, et. al., describing compostable aliphatic-aromatic co-polyesters consisting of 5 to about 40 mol percent of a C2 to C12 aliphatic diacid, with at least 85 mol percent of the remaining acid component being terephthalic acid, and 1 to 30 mol percent of di(ethylene glycol) and tri(ethylene glycol), with the remainder of the glycol component being chosen from the group consisting of ethylene glycol, 1,3-propanediol, and 1,4-butanediol, along with 0.1 to 2.5 mol percent of the co-polyester being composed of moieties comprising alkali or alkaline metal sulfo groups; U.S. Pat. No. 5,171,309 to Gallagher et al., describing sulfonated aliphatic-aromatic co-polyesters that comprise 10–40 mol percent hexahydroterephthalic acid and 0.1 to 2.5 mol percent of moieties having alkali/alkaline metal sulfo groups; U.S. Pat. No. 5,219,646 to Gallagher et al., describing compostable products comprising a blend of starch and aliphatic-aromatic co-polyesters having up to 20 mol percent di(ethylene glycol), 0.1 to 15 mol percent alkali metal or alkaline earth metal sulfo groups, 10 to 40 mol percent aliphatic diacids, such as adipic or glutaric acid, ethylene glycol, and 45 to 89.9 mol percent terephthalic acid; U.S. Pat. No. 5,295,985 to Romesser et al., describing co-polyesters of the '309 patent composition additionally having 0 to 0.4 mol fraction of a polyester derived from hydroxy acids; and U.S. Pat. Nos. 6,018,004 and 6,297,347 to Warzelhan et al., describing biodegradable aliphatic-aromatic co-polyesters that may contain 0 to 5 mol percent of a sulfonate compound; and U.S. Pat. No. 6,368,710 to Hayes, describing sulfonated co-polyesters having about 0.1 to about 10 mol percent of sulfonated compound based on total dicarboxylic acid, and isosorbide.

The sulfonated compositions of the present invention should include an aliphatic dicarboxylic acid component of between 1 and less than 40 mol percent of the total diacid content. In another embodiment, the sulfonated co-polyester aliphatic dicarboxylic acid component is between about 10 and less than 40 mol percent based on total diacid content. In a further embodiment, the sulfonated co-polyester aliphatic acid component is between about 20 and less than 40 mol percent. An example of an aliphatic sulfonate component would include the metal salts of sulfosuccinic acid. The sulfonated compositions of the present invention should include an aromatic dicarboxylic acid component of between greater than 60 and 99 mole percent based on total diacid content. In another embodiment, the aromatic acid component is greater than 60 mol percent up to about 90 mole percent based on total diacid content. In a further embodiment, the aromatic acid component is between 70 and 90 mol percent, optionally between 80 and 90 mol percent based on total diacid content. Examples of useful aromatic sulfonate components as endgroups include the metal salts of 3-sulfobenzoic acid, 4-sulfobenzoic acid, 5-sulfosalicylic acid.

Useful sulfonate components are those in which the sulfonate salt group is attached to an aromatic dicarboxylic acid, the aromatic nucleus of which may be benzene, naphthalene, diphenyl, oxydiphenyl, sulfonyldiphenyl, methylenediphenyl or the like. A useful sulfonate monomer includes the residue of a sulfonate-substituted phthalic acid, terephthalic acid, isophthalic acid, 2,6-naphthalenedicarboxylic acid. A particularly useful sulfonate component is the metal salt of 5-sulfoisophthalic acid or the lower alkyl esters of 5-sulfoisophthalate. The metal salt may be monovalent or polyvalent alkali metal ions, alkaline earth metal ions, or other metal ions and the like. The alkali metal ion may be sodium, potassium or lithium and alkaline earth metals, such as magnesium, are also useful. Other useful metal ions include the transition metal ions, such as zinc, cobalt or iron. In one embodiment, the sulfo group-containing component is between about 0.1 mol percent to about 10 mol percent of the sulfonated co-polyester compositions. The present method is particularly useful when the sulfo group-containing component is in the 0.1 to 5.0 mole percent incorporation level within the sulfonated co-polyester compositions of the present invention.

Useful diol components for practicing the present method include glycols containing from 2 to 12 carbon atoms, glycol ethers containing from 4 to 12 carbon atoms and polyether glycols having the structural formula $HO(AO)_nH$, wherein A is an alkylene group containing from 2 to 6 carbon atoms and n is an integer from 2 to 400. Generally, such polyether glycols will have a molecular weight from about 400 to 4000. The glycols will normally contain from 2 to 8 carbon atoms, but typically from 4 to 8 carbon atoms. Some representative examples of glycols that can be used as the diol component include 1,2-ethane diol, 1,3-propane diol, 1,4-butane diol, 1,6-hexane diol, ethylene glycol, di(ethylene glycol), tri(ethylene glycol), poly(ethylene) glycol, 1,3-propylene glycol, 1,2-propylene glycol, 2,2-diethyl-1,3-propanediol, 2,2-dimethyl-1,3-propane diol, 2-ethyl-2-butyl-1,3-propane diol, 2-ethyl2-isobutyl-1,3-propane diol, 1,3-butane diol, 1,5-pentane diol, 2,2,4-trimethyl-1,6-hexane diol, 1,3-cyclohexane dimethanol, 1,4-cyclohexane dimethanol, 2,2,4,4,-tetramethyl-1,3-cyclobutane diol, isosorbide, poly(alkylene ether) glycols, poly(propylene ether) glycols and the like.

Other biodegradable compounds may be combined with the aliphatic-aromatic co-polyesters. These compounds include starch, protein, cellulose, beeswax, montan-ester wax, leather, paper, fabric, fillers, such as calcium carbonate, calcium carbonate phosphates, and titanium dioxide, cellulosic fillers, silicate fillers, such as silicon dioxide, biodegradable adhesives, polylactic acid, polyhydroxyamide and mixtures of these.

In one embodiment of the present method, the aromatic acid comprises over 60 mol percent up to 99 mol percent of the total acid content of the co-polyester. In another embodiment, the aromatic acid comprises about 61 mol percent up to about 90 mol percent of the total acid content of the co-polyester. In another embodiment, the aromatic acid comprises at least 70 mol percent up to about 90 mol percent of the total acid content of the co-polyester. In a further embodiment, the aromatic acid comprises at least 80 mol percent up to about 90 mol percent of the total diacid content. In a yet further embodiment, the aromatic acid comprises at least 90 mol percent up to about 99 mol percent of the total acid content. In another embodiment, the aromatic acid comprises at least 95 mol percent up to about 99 mol percent of the total diacid content of the co-polyester. In an additional embodiment, the aromatic acid comprises at least 97 mol percent up to about 99 mol percent of the total acid content of the co-polyester.

Of particular importance for the present method are the two biodegradable co-polyesters, "Polymer A" and "Polymer B". Polymer A is a sulfonated aliphatic-aromatic polymer comprising poly(ethylene terephthalate) with 17.5 mol percent DBE-5 (dimethyl glutarate, CAS # 1119-40-0, based on 100 mol percent total acids), 2 mol percent DRL-6 (dimethyl 5-sulfoisophthalate, sodium salt, CAS # 3965-55-7). Polymer B is a sulfonated aliphatic-aromatic co-polyester comprising poly(ethylene terephthalate) with 17.5 mol percent DBE-5 (dimethyl glutarate, CAS # 1119-40-0, based on 100 mol percent total acids), 2 mol percent DRL-6 (dimethyl 5-sulfoisophthalate, sodium salt, CAS # 3965-55-7), and 8 wt. percent poly(ethylene glycol), (1000 MW, bop). The polymer may exist as a particle, film or be laminated.

The Process of Biodegradation

Aliphatic-aromatic co-polyesters derived from the following: terephthalic acid (abbreviation T): ethylene glycol (abbreviation 2G) or other lower alkylene glycol (such as 3G or 4G); polyethylene ether radical (abbreviations DEG or TEG); $C_2$–$C_4$ polyalkylene ether glycol radical of the indicated molecular weight (PAG); and a metal salt of a sulfo derivative, such as a 5-sulfoisophthalic acid (abbreviation 5SI) in an amount about 0.1 to 5.0 mole percent, begin to degrade when subjected to the conditions of high humidity and temperature that typify composts. Table 1 in Muller et al. (supra) surveys the aliphatic components in aromatic co-polyesters.

Biodegradation in composting is believed to be a two-step process. In the first step, hydrolytic enzymes are applied to the solid waste typically by microorganisms present in the compost, which secrete the hydrolytic enzymes. The rate and overall amount of hydrolytic enzyme secretion observed under composting conditions may be very low for complete biodegradation of aliphatic-aromatic co-polyesters. Hydrolytic cleavage of the polyester backbone is recognized as the rate-limiting step during composting. Exogenously supplied hydrolytic enzymes greatly increase the rate of biodegradation of aromatic-aliphatic co-polyesters. The increased amount of enzyme hydrolyzes a higher concentration of the co-polyesters of interest into low molecular weight compounds and/or monomers. Then, microorganisms capable of metabolizing the low molecular weight compounds/monomers catabolize these into biomass, biogas, and liquid leachate. The catabolizing microorganisms may be the same or different from those that secreted the enzymes. The bulk of the low molecular weight compounds/monomers resulting from degradation of the polymer backbone include terephthalic acid, aliphatic acid(s), hydroxyacids(s), and glycols.

A variety of microorganisms may be used in the composting process. For example, microorganisms have been reported which catabolize terephthalic acid. See Bramucci et al., Appl Microbiol Biotechnol, 58:255–259 (2002); U.S. Pat. Nos. 6,187,569 and 6,461,840 to Bramucci et al.; and Junker, F. and Cook, A., Appl Environ Microbiol, 63:2403–2410 (1997). The present method contemplates the use of microorganisms that produce the hydrolytic enzymes as well as catabolize the low molecular weight compounds resulting from hydrolysis so as to effect complete biodegradation. It is further contemplated that microorganisms may be genetically engineered for increased hydrolytic enzyme activity and/or increased ability to metabolize the resultant low molecular weight compounds. As many of the organisms normally isolated from a composting environment are somewhat thermophilic and efficiently degrade solid waste at temperatures of 55–60° C., the present method also contemplates the genetic engineering of microbial catalysts to optimally grow and degrade solid waste at standard composting conditions.

In contrast to composting is the deposition of solid waste into a landfill. A traditional or "dry tomb" landfill is a carefully-designed structure built into or on top of the ground in which solid waste is isolated from groundwater, air and rain. The temperature is that of the surrounding soil or ambient air, humidity is low and the conditions are typically anaerobic, which prevents degradation by microbial action and results in a relatively slow breakdown over the course of decades and even longer, instead of months or years in compost. Somewhat differently, a bioreactor landfill operates to more rapidly transform and degrade solid waste by the addition of liquid and air, which enhances microbial processes of degradation similar to those in composting.

In wastewater, also known as sewage, treatment systems, a generic treatment process includes pumping sewage from residences to the treatment plant. Wastewater entering the plant is first screened for solid debris, such as diapers, beverage bottles, film and other co-polyesters products, sand, gravel, mud, food, etc., which is then sent to landfills. The wastewater is then aerated to remove some dissolved gases and enters a series of tanks, each of which is divided into two sections. The first section is for aeration; air is bubbled through the wastewater which helps to sediment grit, i.e., small, dense particles, which may include co-polyester material. Grit is pumped out of the tank and, like the screened solid debris, taken to landfills. After aeration, the waterwater enters the second, or sedimentation, section, where sludge, or solid organic waste, settles out of the wastewater and is subsequently pumped out of the tank into a digester. While the sludge is settling in the sedimentation tank, the lighter material, which is called the scum and may include grease, oil, co-polyester particles, floats to the surface of the wastewater. Rakes skim the scum from the surface of the wastewater. The scum is also pumped to the digesters along with the sludge. A digester is a large, heated, enclosed tank, in which bacteria breakdown the sludge and scum typically under anaerobic conditions at a temperature of about 36–40 degrees C. for about 18 to 30 days. The pH in the digesting tank generally ranges from 6 to 11. The digested product may be dried and is typically sent to landfills. The above intends not to specify all variations in wastewater treatment systems known to those skilled in the art but to present a broad description.

Biodegradation by microbial action may occur in almost any waste context; however, the rate at which it occurs varies depending especially on the humidity, air content and temperature of the waste context. One of skill in the art can select or engineer suitable hydrolytic enzymes for optimal use under a variety of waste disposal conditions, that is, changes in pH, temperature, etc.

Accelerating Biodegradation: the Present Method

The present method increases the rate of biodegradation of difficult to biodegrade co-polyesters and is useful in most waste contexts, including composting, landfilling and wastewater treatment systems. The present method operates by increasing the rate of hydrolytic cleavage of the polymer backbone of aliphatic-aromatic co-polyesters having greater than 60 mol percent aromatic acid based on total acid content. The increase in hydrolytic cleavage occurs by contacting the co-polyester with hydrolytic enzymes.

Hydrolytic Enzymes in the Present Method

The hydrolytic enzymes useful in the present method are known in the art and include, among others, esterases, lipases, cutinases, and proteases. Hydrolytic enzymes have been used to modify polyesters for: (1) the treatment of a range of organic wastes as reported in U.S. Pat. No. 5,464, 766 to Bruno which provided a powdered enzyme/bacterial fermentation product to digest and liquefy organic waste flushed into on-site waste disposal systems; (2) the modification of the surface of polyesters to adhere more strongly to cationic material, thereby increasing stain resistance, as reported in U.S. Pat. No. 6,254,645 to Kellis et al.; and (3) the hydrolysis of polyesters as reported in U.S. Pat. No. 6,255,451 to Koch et al. and U.S. Pat. No. 6,191,176 to Tadros et al.

Many hydrolytic enzymes are commercially available. The enzymes used in the Examples were obtained commercially (Aldrich Chemicals, Milwaukee, Wis. or Sigma Chemical Company, St. Louis, Mo.).

Alternatively, the hydrolytic enzymes may be biologically produced. Hydrolytic enzymes have been reported in various organisms such as those belonging to bacteria, fungi, yeasts, plants, and animals. Examples of suitable species known to produce suitable enzymes include, but are not limited to *Absidia, Aspergillus, Achromobacter, Aureobasidium, Bacillus, Brochotrix, Candida, Chromobacter, Coprinus, Fusarium, Geotricium, Hansuela, Humicola, Hyphozyma, Lactobacillus, Penicillium, Pseudomonas, Mucor, Rhizomucor, Rhizopus, Rhodotorula, Sporobolomyces, Thermomyces, Thiaroporella*, and *Trichoderma*. Particularly useful are lipases from *Candida antartctica* (particularly component B), *Rhizomucor miehei, Aspergillus niger*, and *Thermomyces lanuginosus*.

Moreover, the hydrolytic enzymes may be genetically engineered. For example, the specificity and the catalytic rate of the enzyme may improve by genetic engineering of the nucleic acid that encodes the enzyme using standard recombinant methods in the art. Plus, the gene encoding the desired enzyme may be expressed, through standard recombinant techniques, in a heterologous host cell for production of the enzyme.

The hydrolytic enzymes may be used as pure enzymes or in the presence of other enzymes and may be un-immobilized or immobilized. In addition, the enzyme catalyst may be in the form of whole cells expressing their endogenous catalyst. Also, a mixture of hydrolytic enzymes may be used to hydrolyze the polyester backbone. The enzymes used in the present method are normally active in the temperature range of 25° C. to 70° C., more effective from 50° C. to 70° C., and most effective from 55° C. to 65° C., reflecting conditions typical of a composting environment. However, one of skill in the art can select hydrolytic enzymes which optimally function under various waste stream conditions.

Numerous enzymes, known in the art, can degrade polymers containing hydrolyzable groups, such as esters, amides etc. U.S. Pat. No. 6,255,451 to Koch et al. teaches the use of a cutinase from *Humicola insolens* and lipases from *Aspergillus niger, Mucor Miehei* (Lipozyme 20,000 L), and *Candida antarica* (lipase component B) to degrade substrate polymers that are aliphatic polyesters, aromatic polyester amides or partially aromatic polyester urethanes. In addition, U.S. Pat. No. 6,066,494 to Hsich et al. and U.S. Pat. No. 6,254,645 to Kellis et al. describe the use of lipases or polyesterases to modify polyester fiber to enhance wettability and absorbancy of textiles. Use of enzymes for treatment of macerated food waste products in conjunction with garbage disposal apparatus has also been Described in U.S. Pat. No. 6,350,607 to Cooney, Jr. Waste treatment compositions containing bacteria and enzymes for municipal and yard waste have been reported in U.S. Pat. No. 5,464,766 to Bruno.

Enzymatic Treatment: Contacting Hydrolytic Enzymes to the Co-Polyester

In order to increase the rate of biodegradation of aliphatic-aromatic co-polyesters having greater than 60 mol percent aromatic acid content based on total acid content, the present method provides a treatment step in which one or more hydrolytic enzymes is contacted to the co-polyesters of interest either before or after disposal. To be clear, the enzymatic treatment is in addition to the biodegradation steps outlined above: hydrolytic cleavage by microorganisms, followed by microbial catabolism. The enzymatic treatment of the present method is a hydrolytic cleavage step additional to the biodegradation process. Thus, the enzymatic treatment of the present method initiates and accelerates hydrolytic cleavage before biodegradation through microbial action. In other words, left in typical waste contexts without the treatment method of the present invention, the co-polyesters of interest would not effectively biodegrade or would do so more slowly. This is because the hydrolytic cleavage done by microbial action alone is relatively slow, or at least slower than desired for composting purposes, at breaking down the polymer backbone of aromatic-aliphatic co-polyesters into low molecular weight compounds that microorganisms can then take up and catabolize.

Enzymatic treatment is effected by contacting the hydrolytic enzyme to a high aromatic content co-polyester. Contacting includes any kind of treatment of the co-polyester by the hydrolytic enzyme, which includes but is not limited to: spraying, painting, coating, pouring, mixing, applying, etc. Contacting may occur during the manufacture and use as well as after disposal of the co-polyester. That is, the present invention contemplates that goods containing high aromatic content co-polyesters and which do not hold consumables or come in contact with skin or mucous membranes may, during manufacture or use, have hydrolytic enzymes applied to them in order to initiate and accelerate the biodegradation process. The terms "pre-treatment", "post-treatment" and "treatment" may be interchangeable and each may refer to contacting hydrolytic enzymes to the co-polyesters of interest. The meaning of these terms is not necessarily defined by when the hydrolytic enzyme is applied to the co-polyester of interest. For example, contacting the hydrolytic enzymes before use or before disposal may be considered "pre-treatment" or "treatment". In the same way, contacting the hydrolytic enzymes after use or at any time after disposal may be considered "post-treatment" or "treatment".

The specifics of contacting the co-polyesters of interest with the hydrolytic enzymes of interest are variable and depend on the nature of the throwaway goods as well as on the expected disposal route. Generally, for composting and landfill waste contexts as well as for solid debris, grit and sludge collected from wastewater treatment systems, there are various embodiments in which the co-polyesters of interest may be contacted with hydrolytic enzymes. After waste collection, which may include the collection of recyclable goods, solid non-recyclable waste may be separated from recyclables. To the solid non-recyclable waste may be applied an aqueous solution that comprises between about 0.1 to about 10.0 weight percent of at least one or a mixture of hydrolytic enzymes so that the aqueous solution contacts the co-polyesters of interest. Such contacting may comprise spraying the solid waste. A second embodiment of contacting includes coating the goods comprising the co-polyesters of interest. Alternatively, such goods may be painted with or dipped in the aqueous solution of hydrolytic enzymes. These examples do not intend to limit the invention; the present method contemplates virtually any way of contacting the co-polyester of interest with the aqueous solution containing the hydrolytic enzyme. Moreover, contacting the solid waste with multiple applications of hydrolytic enzymes is contemplated, again depending on the nature of the throwaway goods and the waste context.

For example, for waste deposited in a municipal compost facility, an aqueous solution of at least one hydrolytic enzyme may be applied at any point during the waste collection process as well as after the waste arrival at the compost facility. Because composting occurs at conditions of high humidity and temperature, it is contemplated that few or even one application of the hydrolytic enzyme solution may provide an adequate acceleration of the biodegradation accomplished by microbial action. As it is important that goods comprising high aromatic co-polyesters are contacted directly with the hydrolytic enzymes, waste masses containing a higher proportion of such goods may be thoroughly saturated with the solution containing hydrolytic enzymes. Alternatively, for waste masses containing fewer of such goods, a thorough spraying may suffice.

Because of the nature of landfilling, in which waste is deposited into the same cell and compacted and covered over daily until the cell is filled and closed, contacting the hydrolytic enzyme solution to solid waste in landfills and/or that screened from wastewater treatment systems will typically occur after the waste has been deposited in the landfill. Multiple applications of hydrolytic enzyme solution to the cell until its closure is contemplated. Traditional "dry tomb" landfills do not achieve the temperatures and humidity of composting but may still achieve elevated temperatures because of the enclosure and because they are largely anaerobic, methane-producing; hydrolytic degradation by microorganisms occurs more slowly than in composting contexts—with landfill degradation taking decades compared to months or years in a compost. Nevertheless, the step of contacting hydrolytic enzymes to the co-polyesters of interest in a traditional landfill will accelerate whatever biodegradation is occurring there. In a bioreactor landfill, degradation conditions come closer to those of composts in that the humidity and the air content are increased. Because of the more favorable conditions, applying hydrolytic enzyme solution to high aromatic co-polyesters in this waste context will act to accelerate the biodegradation rate more quickly than in a dry tomb landfill.

There are at least two stages in the wastewater treatment process when the present method would be useful: in the initial screening for solid debris, a solution of hydrolytic enzymes may be contacted with the solid debris at any point after screening up to the deposition of the debris into a landfill; and later, when sludge and scum have entered the digester, a solution of hydrolytic enzymes may be added to the digester to accelerate the degradation of co-polyester particles. And, of course, the grit and/or digested material may be contacted with hydrolytic enzymes after its deposition in a landfill.

Simulation of Compost with Aquatic Bioreactor

Compost is a complex heterogeneous environment that contains diverse microorganisms, complex organic material and inorganic particulate matter. It is difficult to achieve and maintain consistent operating conditions from one experiment to another. Furthermore, standard analytical methods cannot be easily applied. Therefore, an aquatic bioreactor was designed to evaluate the effects of hydrolytic enzyme treatment on aliphatic-aromatic co-polyesters. The use of aqueous reaction systems to characterize the biodegradability/compostability of polymers has previously been reported, facilitating control of experimental variables. See Kleeberg et al., supra; Gouda et al., supra; and German testing standard DIN V 54900, Deutsches Institut für Normburg 1998 *Testing of the compostability of polymeric materials*, parts 1–3. In the present method, the conditions within the aquatic bioreactor were very similar to those found in a composting environment (55°–60° C., 100 percent relative humidity). Data obtained from the aquatic bioreactor experiments herein parallel those expected from a municipal composting system. Ultimately, the determination that waste biodegradation has accelerated relies on the measurement of the remaining amount of solid polymer in the bioreactor after enzymatic treatment.

Bioreactor

Bioreactor #1 was a standard 500-mL jacketed glass vessel with a screw cap (Bellco Glass Inc., Stock # 1965-50500 W/J). The bioreactor had a magnetic stirrer to provide continuous agitation and was fitted to a controller to maintain the pH at 8.0. A circulating water bath was used to pass water through the bioreactor jacket so as to maintain a constant temperature inside of the bioreactor. Air was bubbled through the bioreactor culture medium at a flow rate of 50 mL/min.

Compost Tea

Compost tea was prepared as reported in the literature with slight modification. Approximately 9 g of each compost was added to 100 mL of SMV1 medium in a separate 500-mL screw cap glass Erlenmeyer flasks. The flasks were incubated in a shaking water bath at 55° C. for 16 h. The top portion of the liquid in each flask (50 mL) was poured into a separate 50-mL centrifuge tube. The tubes were left undisturbed for 5 min to allow the largest particles to settle. The top 40 mL of liquid was removed from each tube and placed into a new 50-mL centrifuge tube. The tubes were centrifuged for 5 min at 5000 rpm. Each pellet was resuspended in 10 mL of SMV1 medium. All of the resuspended pellets were combined to form the concentrated compost tea.

Measurement of Degradation

Numerous methods for measuring polymer degradation are known in the art. Examples of these methods include physical observation, gravimetric analysis, biogas (i.e. carbon dioxide) production, biomass accumulation, characterization of degradation products (for example, using standard analytical techniques such as GC, LC, MS, UV, etc.), and particle size analysis. Specifically, the amount of solid polymer measured before and after enzymatic treatment can be used to determine the speed of degradation per unit time. Additionally, samples can be taken to measure the relative size and concentration of polymer particulate over time in response to various conditions using an optical particle size analyzer. The ability of one or more microorganisms to use the polymer as a carbon source can be measured by an increase in overall biomass.

Culturing Systems

A classical batch culturing method is a closed system where the composition of the medium is set at the beginning of the culture and not subject to artificial alterations during the culturing process. Thus, at the beginning of the culturing process the medium is inoculated with the desired organism or organisms and growth or metabolic activity is permitted to occur adding nothing to the system. Typically, however, a "batch" culture is batch with respect to the addition of carbon source and attempts are often made at controlling factors such as pH and oxygen concentration. In batch systems the metabolite and biomass compositions of the system change constantly up to the time the culture is terminated. Within batch cultures cells moderate through a static lag phase to a high growth log phase and finally to a stationary phase where growth rate is diminished or halted. If untreated, cells in the stationary phase will eventually die. Cells in log phase are often responsible for the bulk of production of end product or intermediate in some systems. Stationary or post-exponential phase production can be obtained in other systems.

A variation on the standard batch system is the Fed-Batch system. Fed-Batch culture processes are also suitable in the present invention and comprise a typical batch system with the exception that the substrate is added in increments as the culture progresses. Fed-Batch systems are useful when catabolite repression is apt to inhibit the metabolism of the cells and where it is desirable to have limited amounts of substrate in the media. Measurement of the actual substrate concentration in Fed-Batch systems is difficult and is therefore estimated on the basis of the changes of measurable factors such as pH, dissolved oxygen and the partial pressure of waste gases such as carbon dioxide. Batch and Fed-Batch culturing methods are common and well known in the art and examples may be found in Thomas D. Brock, In Biotechnology: A Textbook of Industrial Microbiology (1989) $2^{nd}$ Ed. Sinauer Associates, Inc., Sunderland, Mass. ("Brock") or Deshpande, Mukund V. (1992) *Appl. Biochem. Biotechnol.*, 36:227–234.

Commercial production may also be accomplished with a continuous culture. A continuous culture is an open system where a defined culture medium is added continuously to a bioreactor and an equal amount of conditioned medium is removed simultaneously for processing. Continuous cultures generally maintain the cells at a constant high liquid phase density where cells are primarily in log phase growth. Alternatively, continuous culture may be practiced with immobilized cells where carbon and nutrients are continuously added, and valuable products, by-products or waste products are continuously removed from the cell mass. Cell immobilization may be performed using a wide range of solid supports composed of natural and/or synthetic materials.

Continuous or semi-continuous culture allows for the modulation of one factor or any number of factors that affect cell growth or end product concentration. For example, one method will maintain a limiting nutrient such as the carbon source or nitrogen level at a fixed rate and allow all other parameters to moderate. In other systems a number of factors affecting growth can be altered continuously while the cell concentration, measured by media turbidity, is kept constant. Continuous systems strive to maintain steady state growth conditions and thus the cell loss due to media being drawn off must be balanced against the cell growth rate in the culture. Methods of modulating nutrients and growth factors for continuous culture processes as well as techniques for maximizing the rate of product formation are well known in the art of industrial microbiology and a variety of methods are detailed by Brock, supra.

EXAMPLES

The present invention is further defined in the following Examples. It should be understood that these Examples are given by way of illustration only. From the above discussion and these Examples, one skilled in the art can ascertain the essential characteristics of this invention, and without departing from the spirit and scope thereof, can make various changes and modifications of the invention to adapt it to various usages and conditions.

General Methods

Materials and methods suitable for the maintenance and growth of bacterial cultures are well known in the art. Techniques suitable for use in the following examples may be found as set out in Gerhardt, P. et al., eds., MANUAL OF METHODS FOR GENERAL BACTERIOLOGY (1994) American Society for Microbiology, Washington, D.C. or Brock (supra). All reagents, and materials used for the growth and maintenance of bacterial cells were obtained from Aldrich Chemicals (Milwaukee, Wis.), DIFCO Laboratories (Detroit, Mich.), GIBCO/BRL (Gaithersburg, Md.), or Sigma Chemical Company (St. Louis, Mo.), unless otherwise specified.

Hydrolytic enzymes, that is lipases, used in the following examples are products of Novozymes Corporation (Denmark) available commercially from Sigma Chemical. Novozyme™ 871 is a lipase from *Thermomyces lanuginosus* (CAS 9001-62-1; E.C. 3.1.1.5; Sigma product number L0902). Palatase 20000L is a lipase from *Rhizomucor miehei* (CAS 9001-62-1; E.C. 3.1.1.5; Sigma product number L4277). Lipolase 100 L is a lipase from *Thermomyces lanuginosus* (CAS 9001-62-1; E.C. 3.1.1.5; Sigma product number L0777).

Polymers disclosed in this invention can be synthesized by anyone skilled in the art or purchased from Aldrich Chemicals. The polymers that were tested for degradation had the following composition: "Polymer A" is a sulfonated aliphatic-aromatic polymer comprising poly(ethylene terephthalate) with 17.5 mol percent DBE-5 (dimethyl glutarate, CAS # 1119-40-0, based on 100 mol percent total acids), 2 mol percent DRL-6 (dimethyl 5-sulfoisophthalate, sodium salt, CAS # 3965-55-7); "Polymer B" is a sulfonated aliphatic-aromatic co-polyester consisting of poly(ethylene terephthalate) with 17.5 mol percent DBE-5, (dimethyl glutarate, CAS # 1119-40-0, based on 100 mol percent total acids), 2 mol percent DRL-6, (dimethyl 5-sulfoisophthalate, sodium salt, CAS # 3965-55-7), and 8 wt. percent poly (ethylene glycol), (1000 MW, bop).

The meaning of abbreviations is as follows: "h" means hour(s), "min" means minute(s), "sec" means second(s), "d" means day(s), "mL" means milliliters, "L" means liters, "µL" means microliters, "g" means grams, "mg" means milligrams, "µg" means micrograms, "M" means molar, "mM" means millimolar, "µM" mean micromolar, and "OD"=optical density at a specified wavelength.

Example 1

Enzyme Assay to Determine Effect of Lipase on Various Substrates

This example describes how treatment with a lipase releases terephthalic acid from aliphatic-aromatic co-polyesters. The polymer substrates were milled in a Bantam Micropulverizer (Mikropul, Summit, N.J.) using a final screen size of 0.006 inches. Samples of polymer substrate were incubated with lipase (Novozyme™ 871) in glass 125 mL screw cap Erlenmeyer flasks. Polymer substrates were suspended in 10 mM potassium phosphate buffer, pH 7.0, at a final concentration of 0.4 percent (w/v). Enzyme was added to the flasks from a stock solution (0.5 units/mL) to a final concentration of 10 units/mL. Control flasks of buffer alone, enzyme alone, and substrate alone were also prepared.

The flasks were closed tightly and incubated at 55° C. in a shaking water bath. After an initial sample ($T_0$), samples were withdrawn at 24 h ($T_{24}$) and 48 h ($T_{48}$). The samples were passed through a 0.45 micron Acrodisc® syringe filter (Pall corp., Ann Arbor, Mich.). The amount of terephthalic acid that was released from each polymer substrate during incubation was determined by measuring the absorbance of ultraviolet light at $\lambda=240$ nanometers ($Abs_{240}$) for each sample. The values for $Abs_{240}$ were averaged for duplicate flasks at each sample time. The change in absorbance (i.e., amount of terephthalate released) that was caused by enzyme activity after 48 h was determined by subtracting the $T_{48}$ average $Abs_{240}$ for a polymer without enzyme from the $T_{48}$ average $Abs_{240}$ for the same polymer with enzyme.

The $Abs_{240}$ value for a substrate incubated with enzyme was consistently higher than the $Abs_{240}$ value for the same substrate incubated without enzyme. The $\Delta Abs_{240}$ at $T_{48}$ values indicated that the most terephthalic acid was released from Polymer B, and the least terephthalic acid was released from PET.

contained 350 mL of SMV1 culture medium (0.05 M potassium phosphate buffer (pH 8.0), 0.01 M ammonium sulfate, 0.001 percent yeast extract, 2 mM $MgCl_2$, 0.7 mM $CaCl_2$, 0.05 mM $MnCl_2$, 0.001 mM $ZnCl_3$, 0.002 mM thiamine hydrochloride, 1.72 μM $CuSO_4$, 2.53 μM $CoCl_2$, 2.42 μM $NaMoO_2$, 0.005 g vitamin B12, 0.005 g p-aminobenzoic acid, and 0.5 mL/L BME Vitamins (Sigma-Aldrich Chemical) with 0.4 percent (w/v) of Polymer B. The commercially available lipases Novozyme 871 (10 units/mL final concentration), Palatase 20000L (10 units/mL final concentration) and Lipolase 100L (1 unit/mL final concentration) were added to the bioreactor. Additional bioreactors that were essentially identical to Bioreactor #1 were operated at the same time as controls to evaluate the effectiveness of the lipase treatment. Bioreactor #2 contained SMV1 medium with 0.4 percent PET and the same commercial lipases as Bioreactor #1. Bioreactor #3 contained SMV1 medium with 0.4 percent PET without added lipases. Bioreactor #4 contained SMV1 medium with 0.4 percent Polymer B without added lipases. The lipases were added to Biore-

TABLE 1

Release of Terephthalic Acid from Various Sample Polymers Treated with Lipase Novozyme ™ 871

| Flask | Treatment | $Abs_{240}$ | | | Average $Abs_{240}$ at $T_{48}$[a] | $\Delta Abs_{240}$ at $T_{48}$[b] |
|---|---|---|---|---|---|---|
| | | $T_0$ | $T_{24}$ | $T_{48}$ | | |
| 1 | Buffer | 0.002 | 0.001 | 0.002 | | |
| 2 | Buffer | 0 | −0.003 | 0.002 | 0.002 | |
| 3 | Enzyme | 0.005 | 0.003 | 0.006 | | |
| 4 | Enzyme | 0.006 | 0 | 0.004 | 0.005 | |
| 5 | Polymer A | 0.003 | 0.145 | 0.203 | | |
| 6 | Polymer A | 0.002 | 0.132 | 0.195 | 0.199 | |
| 7 | Polymer A + Enzyme | 0.003 | 0.257 | 0.345 | | |
| 8 | Polymer A + Enzyme | 0.001 | 0.255 | 0.345 | 0.345 | 0.146 |
| 9 | Polymer B | 0.002 | 0.371 | 0.503 | | |
| 10 | Polymer B | 0.006 | 0.37 | 0.506 | 0.505 | |
| 11 | Polymer B + Enzyme | 0.015 | 0.643 | 0.847 | | |
| 12 | Polymer B + Enzyme | 0.012 | 0.581 | 0.756 | 0.802 | 0.297 |
| 13 | PET | −0.003 | 0.004 | 0.006 | | |
| 14 | PET | −0.003 | 0.014 | 0.022 | 0.014 | |
| 15 | PET + Enzyme | −0.001 | 0.024 | 0.025 | | |
| 16 | PET + Enzyme | 0 | 0.015 | 0.018 | 0.022 | 0.008 |

[a]Average of sample values from duplicate flasks.
[b]$\Delta Abs_{240}$ = ($Abs_{240}$ of substrate Y with enzyme) − ($Abs_{240}$ of substrate Y)

Example 2

Improved Degradation of Lipase Treated Polymer B

This example describes how initially treating Polymer B with commercially-available lipases allowed the polymer to be more rapidly degraded by a consortium of microorganisms derived from compost.

The initial treatment of Polymer B with lipase and subsequent treatment of Polymer B with a consortium of microorganisms was performed in Bioreactor #1. Bioreactor #1 was a standard 500-L jacketed glass vessel with a screw cap (Bellco Glass Inc., Stock # 1965-50500 W/J). The bioreactor had a magnetic stirrer to provide continuous agitation and was fitted to a controller to maintain pH 8.0. A circulating water bath was used to pass water through the bioreactor jacket to maintain a constant temperature inside the bioreactor (initially 55° C., 58° C. after 42 days of operation). Air was bubbled through the bioreactor culture medium at a flow rate of 50 mL/min. The bioreactor initially actor #1 and Bioreactor #2 at the beginning of the experiment (Day 1) and again on Day 15.

After 24 h of operation, all of the bioreactors were inoculated with microorganisms as concentrated "compost tea" that was made with four different composts (a compost of crab shells and saw dust, a compost of poultry litter, and two different composts of yard clippings). Approximately 9 g of each compost was added to 100 mL of SMV1 medium in separate 500 mL screw cap glass Erlenmeyer flasks. The flasks were incubated in a shaking water bath at 55° C. for 16 h. The top portion of the liquid in each flask (50 mL) was poured into a separate 50-mL centrifuge tube. The tubes were left undisturbed for 5 min to allow the largest particles to settle. The top 40 mL of liquid was removed from each tube and placed into a new 50 mL centrifuge tube. The tubes were centrifuged for 5 min at 5000 rpm in a Sorval T6000D tabletop centrifuge. Each pellet was resuspended in 10 mL of SMV1 medium. All of the resuspended pellets were combined to form the concentrated compost tea. Each bioreactor was inoculated with 3.5 mL of concentrated compost tea. Samples (5 mL) for particle size analysis were removed from the bioreactors while the culture medium was continuously stirred. The samples were mixed with an equal volume of ethanol and analyzed on the same day with a laser diffraction instrument (Beckman Coulter LS230).

Figure 1B:
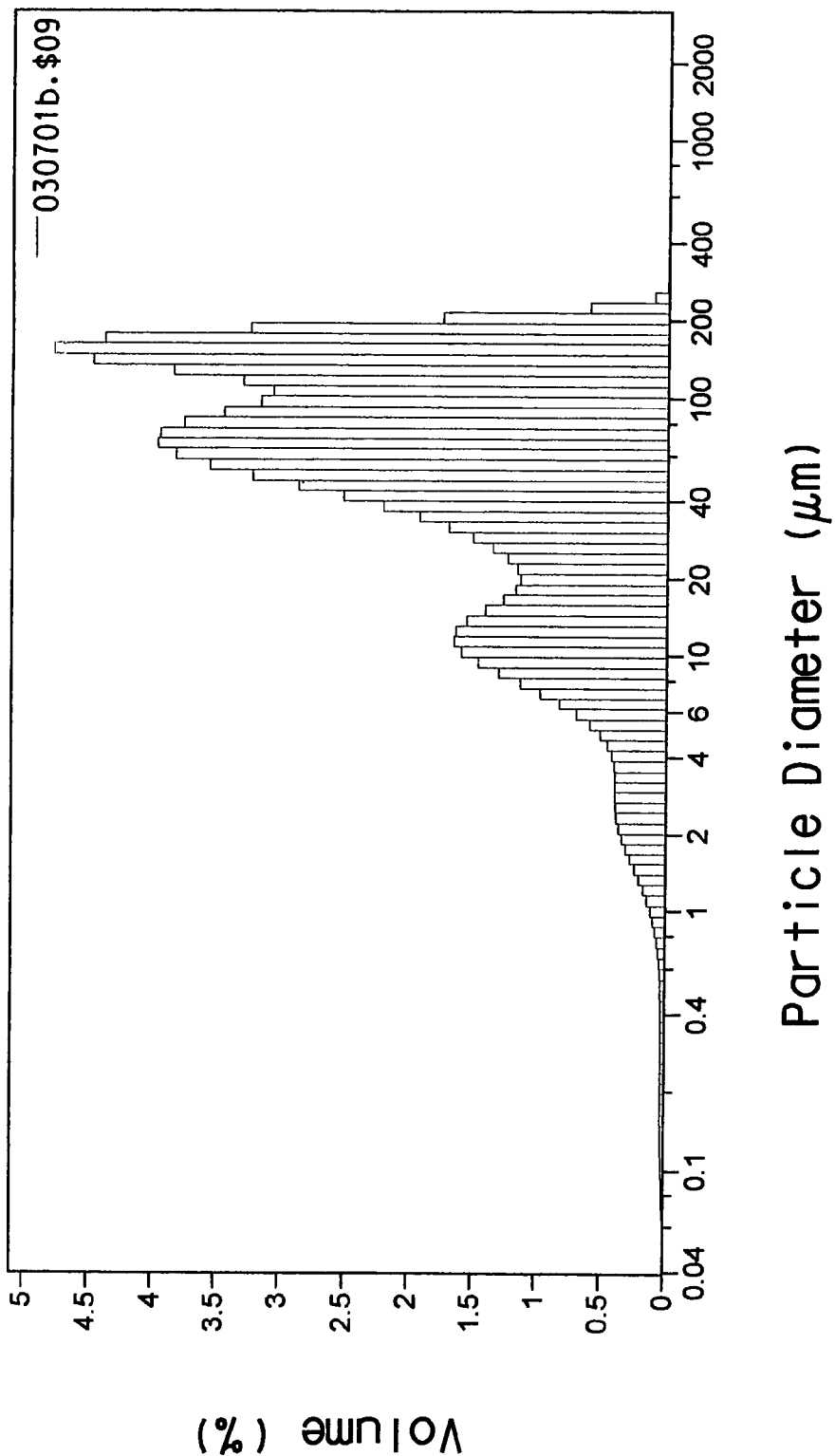
Figure 1C:
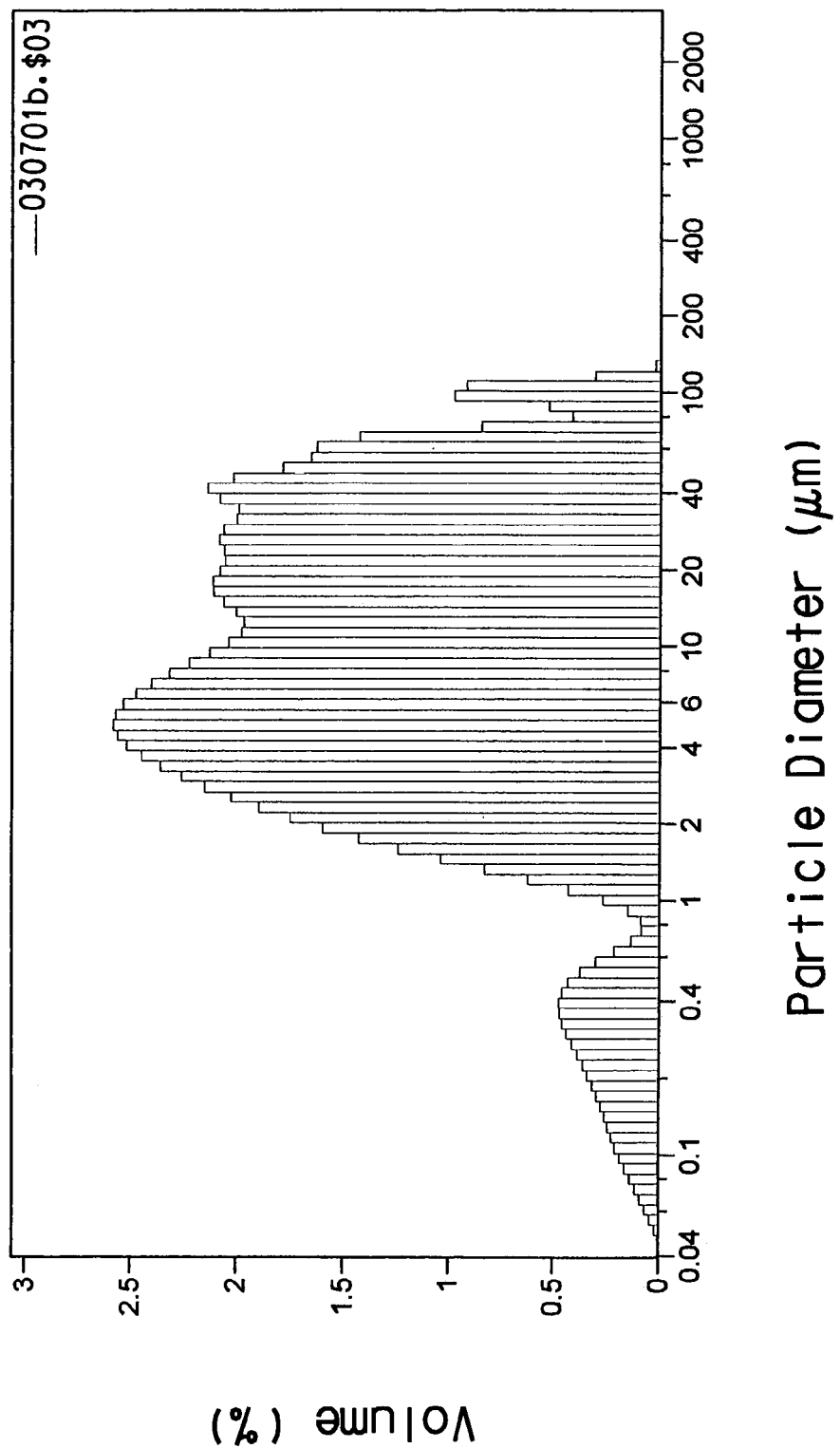
Figure 2A:
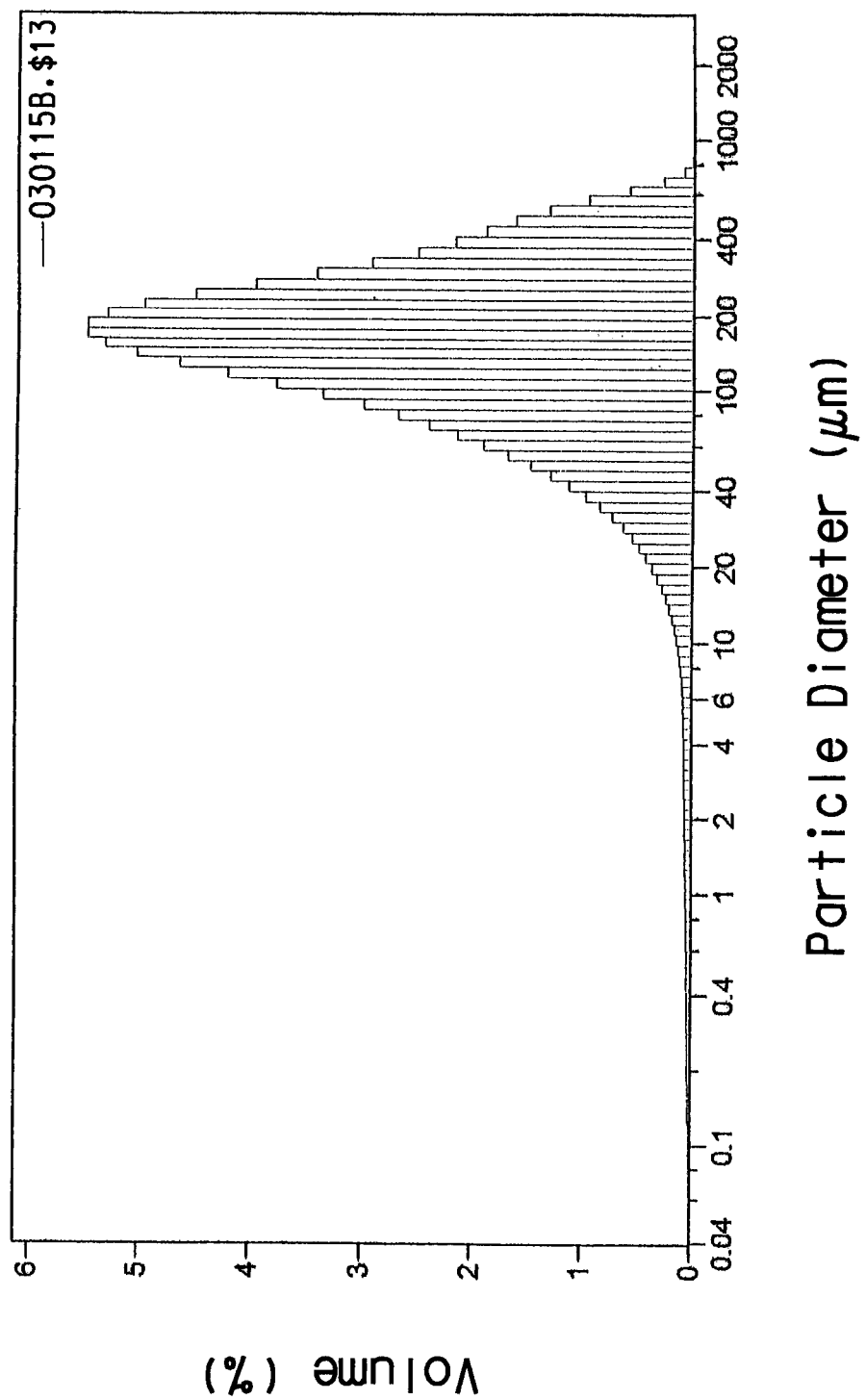
FIG. 2 shows the effect of lipase treatment on the degradation of polyethylene terephthalate (PET) as measured by decreases in polymer particle size distribution in an aquatic bioreactor.
Figure 2B:
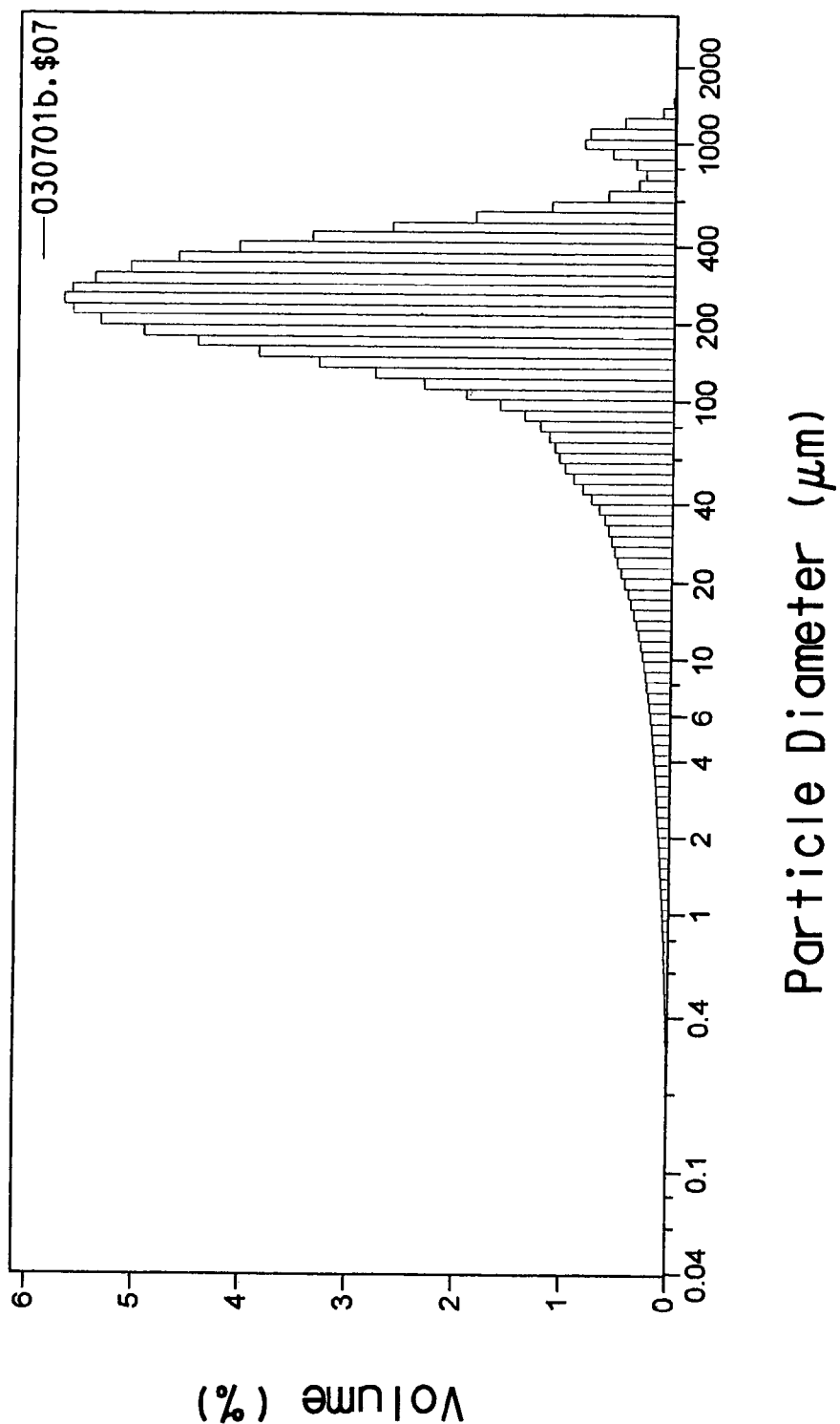
Figure 2C:
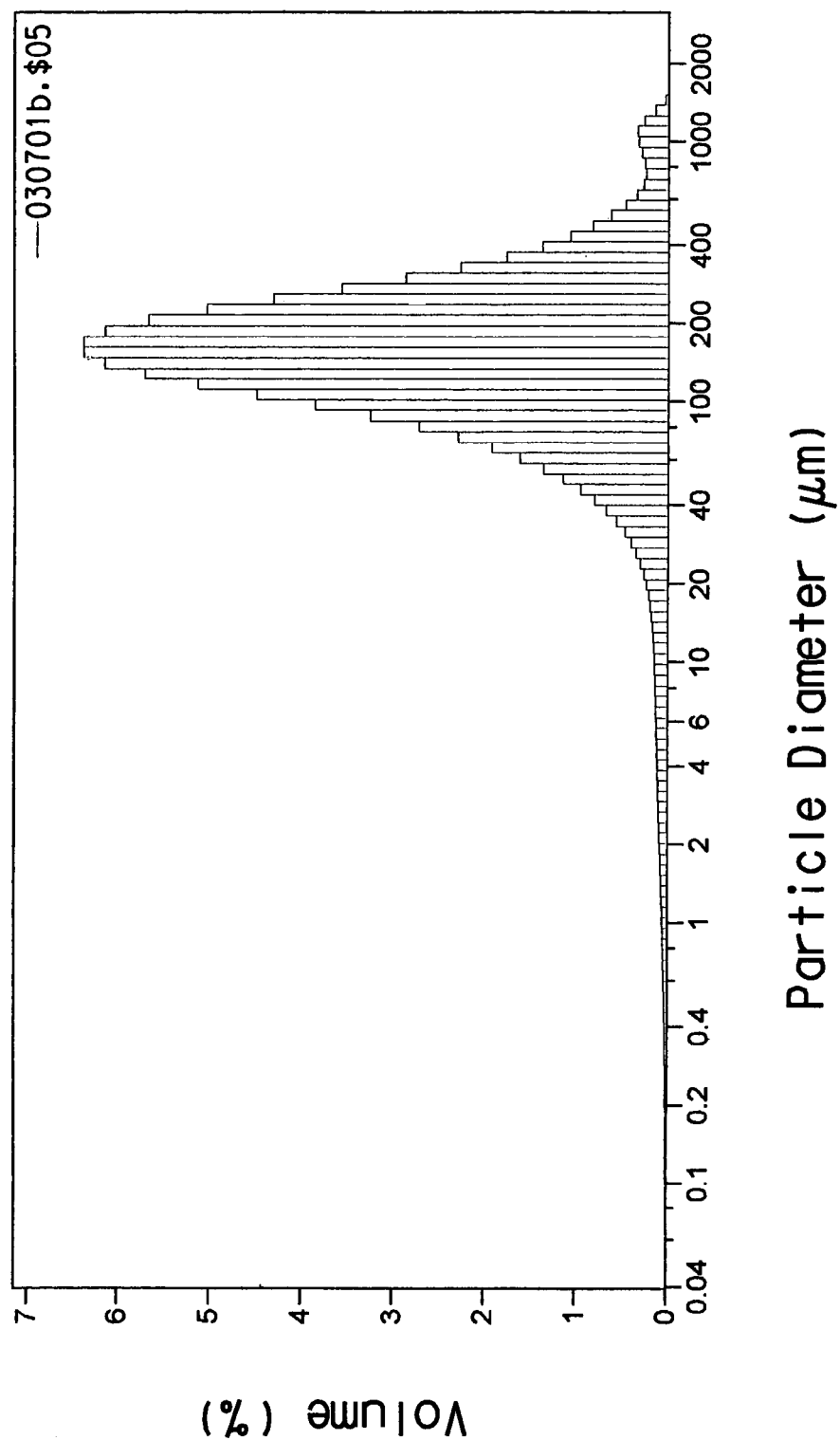

The size distributions of Polymer B and PET particles were plotted in a volume-weighted distribution that emphasized the presence of larger particles, particularly those that were greater than 40 µm in diameter. There were no significant differences in the particle size distributions for early samples from any of the bioreactors (data not shown). On Day 90, the distribution of particle sizes for lipase treated Polymer B differed significantly from untreated Polymer B (FIG. 1). Untreated Polymer B had a broad distribution of particle diameters that ranged from less than 10 µm to about 600 µm, with a major portion of the particles being in the 200 µm to 600 µm range whereas lipase treated Polymer B was deficient in particles in this size range. Furthermore, the peak size of the lipase treated Polymer B (approximately 150 µm) was much less than the peak size of the untreated Polymer B (approximately 250 µm). These data indicated that treatment with lipase significantly accelerated biodegradation of Polymer B by the microbes that were initially contained in the concentrated compost tea. In contrast, lipase treatment and incubation with microbes contained in the concentrated compost tea had little or no effect on PET (FIG. 2).

What is claimed is:

1. A method for increasing hydrolytic degradation by microorganisms of an aliphatic-aromatic co-polyester,
   the co-polyester comprising
      at least one aromatic dicarboxylic acid or an ester thereof, and
      at least one aliphatic dicarboxylic acid or an ester thereof,
   the aromatic acid comprising greater than 60 mol percent to about 99 mol percent of total dicarboxylic acid in the co-polyester,
   the method comprising contacting at least one hydrolytic enzyme in aqueous solution to the co-polyester.

2. The method of claim 1, wherein the co-polyester comprises at least about 61 mol percent to about 90 mol percent of the at least one aromatic dicarboxylic acid or ester, based on total dicarboxylic acid in the co-polyester.

3. The method of claim 2, wherein the co-polyester comprises at least about 70 mol percent of the at least one aromatic dicarboxylic acid or ester, based on total dicarboxylic acid in the co-polyester.

4. The method of claim 2, wherein the co-polyester comprises at least about 75 mole percent of the at least one aromatic dicarboxylic acid or ester, based on total dicarboxylic acid in the co-polyester.

5. The method of claim 2, wherein the co-polyester comprises at least about 80 mole percent of the at least one aromatic dicarboxylic acid or ester, based on total dicarboxylic acid in the co-polyester.

6. The method of claim 1, wherein the at least one aromatic dicarboxylic acid or ester is selected from the group consisting of terephthalic acid, dimethyl terephthalate, isophthalic acid, dimethyl isophthalate, 2,6-napthalene dicarboxylic acid, dimethyl-2,6-dicarboxylic acid, dimethyl-2,6-naphtalate and mixtures of these; and wherein the at least one aliphatic dicarboxylic acid or ester is selected from the group consisting of succinic acid, dimethyl succinate, glutaric acid, dimethyl glutarate, 2-methylglutaric acid, 3-methylglutaric acid, adipic acid, dimethyl adipate, oxalic acid, dimethyl oxalate, malonic acid, dimethyl malonate, and mixtures of these.

7. The method of claim 6, wherein the co-polyester comprises between about 1 mol percent and less than about 40 mol percent of the at least one aliphatic acid or ester, based on total dicarboxylic acid in the co-polyester.

8. The method of claim 6, wherein the co-polyester comprises between about 20 mole percent and less than about 40 mol percent of the at least one aliphatic acid or ester, based on total dicarboxylic acid in the co-polyester.

9. The method of claim 1, wherein the co-polyester is combined with starch, protein, cellulose, wax, fillers, silicate fillers, polylactic acid, polyhydroxyamide or mixtures of these.

10. The method of claim 3, wherein the co-polyester further comprises at least one diol.

11. The method of claim 10, wherein the at least one diol is selected from the group consisting of 1,2-ethane diol, 1,3-propane diol, 1,4-butane diol, 1,6-hexane diol, ethylene glycol, di(ethylene glycol), tri(ethylene glycol), poly(ethylene glycol), poly(alkylene ether) glycols, poly(propylene ether) glycols and mixtures of these.

12. The method of claim 1, wherein the co-polyester further comprises a sulfonated compound.

13. The method of claim 12, wherein the co-polyester comprises between about 0.1 to about 10.0 mole percent of a sulfonated compound, based on total diol or total dicarboxylic acid in the co-polyester.

14. The method of claim 12, wherein the sulfonated compound is selected from the group consisting of a sulfonated mono or dicarboxylic acid or an ester or metal salt thereof.

15. The method of claim 12, wherein the sulfonated compound is selected from the group consisting of sulfosuccinic acid, 3-sulfobenzoic acid, 4-sulfobenzoic acid, 5-sulfosalicylic acid, sulfophthalic acid, sulfoterephthalic acid, and 5-sulfoisophthalic acid, or an ester or salt thereof.

16. The method of claim 12, wherein the co-polyester comprises between about 20 mol percent to less than about 40 mole percent of the at least one aliphatic carboxylic acid or ester, based on total dicarboxylic acid in the co-polyester.

17. The method of claim 12, wherein the co-polyester further comprises at least one diol.

18. The method of claim 1, wherein the co-polyester comprises about 17.5 mol percent dimethyl glutarate and about 2 mol percent dimethyl 5-sulfoisophthalate, sodium salt, based on total dicarboxylic acid in the co-polyester.

19. The method of claim 18, wherein the co-polyester further comprises about 8 wt percent poly(ethylene glycol).

20. The method of claim 1, wherein the aqueous solution comprises between about 0.1 to about 10 wt percent of the at least one hydrolytic enzyme.

21. The method of claim 1, wherein the at least one hydrolytic enzyme is selected from the group consisting of proteases, lipases, cutinases, esterases and a combination of these.

22. The method of claim 6, wherein the at least one hydrolytic enzyme comprises a lipase.

23. The method of claim 10, wherein the at least one hydrolytic enzyme comprises a lipase.

24. The method of claim 12, wherein the at least one hydrolytic enzyme comprises a lipase.

25. The method of claim 1, wherein the contacting of the at least one hydrolytic enzyme is selected from the group consisting of spraying, painting, coating, applying, treating and mixing the at least one hydrolytic enzyme with the co-polyester.

26. The method of claim 1, wherein the contacting of the at least one hydrolytic enzyme to the co-polyester occurs before degradation of the co-polyester by the microorganisms.

27. The method of claim 1, wherein the co-polyester is situated in a waste context.

28. The method of claim 27, wherein the waste context is solid waste, compost, or wastewater treatment system.

29. The method of claim 27, wherein the contacting of the at least one hydrolytic enzyme is selected from the group consisting of spraying, painting, coating, applying, and mixing the at least one hydrolytic enzyme with the co-polyester.

* * * * *